3,634,494
CATALYTIC PROCESS FOR MANUFACTURE OF UNSATURATED ACIDS AND ESTERS

Kin Hsueh-Yuan Tsu, Norwalk, Conn., assignor to American Cyanamid Company, Stamford, Conn.
No Drawing. Filed Apr. 23, 1969, Ser. No. 818,818
Int. Cl. C07c 69/54
U.S. Cl. 260—486 D          8 Claims

ABSTRACT OF THE DISCLOSURE

Lower aliphatic acids, e.g., isobutyric acid, and esters, e.g. methyl isobutyrate, are dehydrogenated in presence of oxygen and a solid heterogeneous dehydrogenation catalyst at temperatures in the range from 250 to 600° C. The catalysts are calcined mixed phosphates of iron, bismuth and in some embodiments, lead. Good conversion and selectivity are demonstrated in the examples.

---

The invention relates to synthesis of unsaturated lower aliphatic acids and esters of such acids, by catalytic oxydehydrogenation of the corresponding saturated acids and esters.

Catalytic dehydrogenation of lower alkane acids and their esters has been described in prior art. One known process has been carried out using a metal oxide catalyst but with no molecular oxygen present during the dehydrogenation. In such a process the catalyst is rapidly deactivated and requires frequent regeneration. Such a process operates with relatively low conversion per pass which increases operating cost and size requirement for equipment. See data presented in Ind. & Eng. Chem. Prod. Res. and Development vol. II p. 287 (1963) and U.S. Pat. 2,945,057. Another known process for dehydrogenation of lower alkane acids and their esters has been carried out with a metal sulfide oxidizing agent but again without the presence of molecular oxygen. In that process the metal sulfide acts as a mild oxidizer which is chemically reduced and requires frequent regeneration. See U.S. Pat. No. 3,370,087.

Oxydehydrogenation is a term that has been used to describe processes for dehydrogenation of hydrocarbons with oxygen in presence of a catalyst. Because of the relative instability of lower aliphatic acids and esters, as compared for example with hydrocarbons, it would have been reasonable to predict that organic acids and esters would oxidize, decompose or otherwise be destroyed non-selectively, in presence of oxygen at temperatures that were previously used in oxydehydrogenation processes.

In accordance with the invention a lower aliphatic acid or an ester thereof, having the formula:

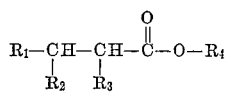

wherein: each of $R_1$, $R_2$, $R_3$, and $R_4$ is selected from hydrogen and lower alkyl groups containing 1–4 carbon atoms, is selectively dehydrogenated to the $\alpha$–$\beta$ unsaturated equivalent acid or ester by contacting a gas feed mixture comprising oxygen and the organic compound with oxydehydrogenation catalyst comprising bismuth, iron, and in some embodiments lead, combined with phosphorus and oxygen, described nominally as calcined phosphates of the metals. Dehydrogenation occurs at temperatures from about 250° C. to about 600° C. For economy, a preferred pressure for the oxydehydrogenation is about atmospheric pressure, but the process may be carried out at pressures in the range from about 0.3 atmosphere to about 10 atmospheres or higher if desired. Water, present as steam during the reaction is found to improve the results of the process. The ratio of oxygen to saturated acid or ester in the feed mixture is preferably about one gram atom oxygen per mole acid or ester but the process may be operated with mixtures having from about 0.1 to about 6 gram atoms oxygen per mole of compound to be dehydrogenated.

Catalysts for use in a process according to the invention may be prepared by precipitating phosphates of bismuth, iron, and when used, lead from aqueous solution by reaction of soluble salts of these metals with phosphoric acid or ammonium phosphate or other reactive soluble phosphate. The precipitate of metal phosphates is washed and dried and then calcined at temperatures from about 400° to about 600° C. Calcined phosphates of the kind described, having varying proportions of bismuth, iron, phosphorus and when used, lead, will be found effective as catalysts in accordance with the invention.

The dehydrogenation catalysts found useful according to the invention are calcined mixed phosphates of iron, bismuth and in some embodiments, lead. The class of useful catalysts is conveniently represented by the formula:

$$x\text{Bi},\ \text{Fe},\ n\text{Pb},\ y\text{P},\ z\text{O}$$

wherein Bi, Fe, Pb, P and O have their conventional meaning as chemical symbols, and wherein, relative to one atom of iron in the catalyst, $x$ has a value from 0.1 to 12 representing the proportion of bismuth atoms in the catalyst, $n$ has a value from zero to 12 representing the proportion of lead atoms in the catalyst, $y$ has a value from 1.1 to 21 representing the proportion of phosphorus atoms in the catalyst, and $z$ has a value from 4.4 to 84 representing the proportion of oxygen atoms in the catalyst.

The proportion of oxygen combined in an operating catalyst may fall within a broad range depending on specific conditions of preparation and use. It is difficult to determine an exact proportion of oxygen atoms that will be combined in any given catalyst of the kind described without specific analysis.

The catalyst may be used in its calcined solid form without support, or it may be used on a catalyst support such as a suitable alumina or silica substrate. In a preferred embodiment a volume of particulate granules of the calcined catalyst is dispersed with from about 5 to about 20 volumes of quartz granules or other inert particles in a solid catalyst bed through which the feed gas mixture is passed.

The acid or ester to be dehydrogenated is vaporized and mixed in gaseous state with oxygen or with a mixture of gases comprising free molecular oxygen. A gas feed mixture comprising these gases is preheated and contacted with the catalyst at a reaction temperature usually in the range from about 250 to about 600° C.

Contact time is expressed in units of time and is defined as the ratio of catalyst volume to total gas feed rate, e.g., cu. ft. catalyst per cu. ft. gas feed per sec., at standard temperature and pressure (0° C., 760 mm. Hg) calculated assuming ideal gas behavior. Catalyst volume for this calculation is defined as the bulk volume occupied by catalyst in the reactor, at room temperature, with no flow, and not including volume occupied by any inert material such as quartz granules which may also be in the reactor. For this calculation all gases in the feed gas stream are included in the total gas feed volume. The dehydrogenation may be carried out at contact times from about .02 to about 60 seconds or higher. With fixed beds, optimum contact time usually will be lower than with fluidized beds.

The reaction pressure may be atmospheric pressure or thereabout for convenience, although other pressures may be used if desired.

Optimum concentration of oxygen in the feed gas usually will be about one gram atom oxygen per mole of acid or ester but the concentration for optimum operation may vary from about 0.2 to about 3 gram atoms per mole under varied conditions. It is preferable that the molar concentration of acid or ester to be dehydrogenated should not exceed about 20 mole percent of the total feed stream and the gas feed stream may be diluted to the desired concentration by including nitrogen or other inert gas, e.g. argon or the like in the feed stream as needed to obtain the desired dilution, usually optimum in the range from 2 to 15 mole percent acid or ester in the feed stream.

Water, present as steam in the feed gas mixture, is found to improve product yields and may optionally be included up to about 40 moles $H_2O$ per mole of acid or ester in the feed stream. Optimum concentration usually will be in the range from 0.5 to 20 moles $H_2O$ per mole acid or ester in the feed gas mixture.

The gas feed stream is contacted with catalyst which is used in solid form as a heterogeneous catalyst; the solid catalyst may be employed in any suitable manner, as by any of the conventional means for contacting a solid heterogeneous catalyst with gaseous reactants such as a fixed catalyst bed or a fluidized bed of the catalyst, etc.

Following are specific examples embodying the invention including detailed description of the best mode presently contemplated of carrying out the invention. Full scope of the invention may of course extend beyond specific details of these examples.

CATALYST PREPARATION

Method A 20.2 gms. of $Fe(NO_3)_3 \cdot 9H_2O$ and 48.5 gm. of $Bi(NO_3)_3 \cdot 5H_2O$ are dissolved in 1 N $HNO_3$ to make a solution of 150 ml. volume. Slight heat can be applied to hasten solution of the salts. The solution is diluted with either distilled water or with 1 N nitric acid to make 500 ml., then 500 ml. of aqueous solution containing 132 gms. of $(NH_4)_2HPO_4$ is added slowly with stirring. A milky precipitate results which is filtered from the liquid and washed with one liter of distilled water. The filter cake is dried overnight at 130° C., then calcined at 480°–600° C. for two hours. The calcined cake is broken into −30+35 mesh granules for use as solid catalyst. Nominal composition of the calcined catalyst is 2 Bi, Fe, 3 P and oxygen. The same procedure is followed except using 48.5 gm. $Bi(NO_3)_3 \cdot 5H_2O$ and 40.4 gm. $Fe(NO_3)_3 \cdot 9H_2O$ to make catalyst having composition: Bi, Fe, 2 P and oxygen. The same procedure is followed again except using 60.6 gm. $Bi(NO_3)_3 \cdot 5H_2O$ and 20.2 gm. $Fe(NO_3)_3 \cdot 9H_2O$ to produce composition: 2.5 Bi, Fe, 3.5 P and oxygen.

Method B

The same procedure described in the first preparation by Method A is followed except 9.96 gm. $Pb(NO_3)_2$ is added to the solution containing bismuth and iron salts before dilution. The molal proportion of metals is 2 Bi, Fe, 0.6 Pb, 3.4, P.

Catalytic process

For each of Examples 1–9 described below, conversion and selectivity are determined based upon the total grams isobutyric acid in the feed stream and the total grams isobutyric acid and methacrylic acid recovered from the product stream during the entire run. Percent conversion is defined as the percentage of compound to be dehydrogenated that is actually converted regardless of product and is calculated by subtracting moles of the compound recovered from moles of the compound fed, dividing the difference by moles compound fed then multiplying by 100. Percent selectivity is defined as the percentage of total reactant compound consumed that is converted to the desired product, i.e., converted to the dehydrogenated acid or ester product. Accordingly, percent selectivity is calculated by dividing moles of the desired product recovered by the difference between moles of the reactant compound fed and moles of the same reactant compound recovered, then multiplying by 100.

EXAMPLES 1–9

The catalyst granules prepared by each of methods A and B, above are mixed in respective batches each with −30 +35 mesh quartz granules and packed into a cylindrical fixed bed catalytic reactor. For contact time of .27 second there is used a mixture of 4.1 cc. catalyst, 20 cc. quartz. For contact time of .09 second there is used a mixture of 1.5 cc. catalyst, 25 cc. quartz. Liquid feed components are continuously vaporized and mixed with the gas feed components and the mixed gases are preheated then fed to the reactor at conditions shown in Table 1 for each example.

Percent conversion and percent selectivity for each example shown in Table 1 are determined by gas chromatographic analysis of the product stream taken from the reactor. Components of the feed stream can be separated by conventional separation methods.

EXAMPLE 10

Using the same apparatus and procedures described in the foregoing Examples 1–9, methyl isobutyrate is dehydrogenated to produce methyl methacrylate. The catalyst is that prepared by Method B above. The mixed gas feed stream contains 5.7 mole percent methyl isobutyrate with 0.9 mole oxygen and 10 moles steam per mole methyl isobutyrate, and is diluted with nitrogen. Reaction temperature is 450° C. and contact time is 0.09 second. Conversion is 58% with 39% selectivity. 4% of the underhydrogenated feed is hydrolyzed to isobutyric acid and 67% of the dehydrogenated product is hydrolyzed to methacrylic acid. Conversion and selectivity calculations include the hydrolyzed feed and product as if they were not hydrolyzed.

TABLE I.—OXYDEHYDROGENATION OF ISOBUTYRIC ACID (IBA) TO METHACRYLIC ACID

All feed streams contain 5.7 mole percent IBA with indicated proportions of oxygen and steam and diluted with nitrogen

| Example | Catalyst prepared by Method— | Molal ratio of metals in catalyst | Mole $O_2$ per Mole IBA | Mole steam per Mole IBA | Contact time, seconds | Reaction temp., °C. | Conversion, percent | Selectivity, percent |
|---|---|---|---|---|---|---|---|---|
| 1 | A | Bi, Fe, 2 P | 1 | 4 | .27 | 400 | 82 | 37 |
| 2 | A | 2.5 Bi, Fe, 3.5 P | 1 | 4 | .27 | 315 | 33 | 40 |
| 3 | A | 2 Bi, Fe, 3 P | 1 | 0 | .27 | 350 | 26 | 47 |
| 4 | A | 2 Bi, Fe, 3 P | 1 | 4 | .27 | 350 | 44 | 56 |
| 5 | A | 2 Bi, Fe, 3 P | 0.6 | 10 | .09 | 450 | 63 | 74 |
| 6 | A | 2 Bi, Fe, 3 P | 0.6 | 4 | .09 | 450 | 57 | 70 |
| 7 | B | 2 Bi, Fe, 0.6 Pb, 3.4 P | 0.5 | 0 | .27 | 400 | 41 | 56 |
| 8 | B | 2 Bi, Fe, 0.6 Pb, 3.4 P | 0.6 | 10 | .09 | 450 | 66 | 78 |
| 9 | B | 2 Bi, Fe, 0.6 Pb, 3.4 P | 0.25 | 10 | .09 | 400 | 29 | 82 |

I claim:
1. Process for making unsaturated acids and esters by dehydrogenation of a compound defined by the formula:

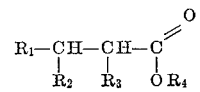

wherein:
each of $R_1$, $R_2$, $R_3$ and $R_4$ is selected from hydrogen and lower alkyl groups containing 1–4 carbon atoms, which process comprises contacting a feed gas mixture comprising said compound and oxygen at temperature in the range from about 250 to about 600° C. with solid catalyst comprising metals selected from bismuth, iron and lead, and defined by the formula:

$x$Bi, Fe, $n$Pb, $y$P, $z$O wherein, relative to one atom of iron in the catalyst,
$x$ has a value from 0.1 to 12 representing the proportion of bismuth atoms in the catalyst,
$n$ has a value from zero to 12 representing the proportion of lead atoms in the catalyst,
$y$ has a value from 1.1 to 21 representing the proportion of phosphorus atoms in the catalyst, and
$z$ has a value from 4.4 to 84 representing the proportion of oxygen atoms in the catalyst.

2. Process defined by claim 1 wherein contact time is in the range from .02 to 60 seconds.

3. Process defined by claim 1 carried out at pressure in the range from 0.3 to 10 atmospheres.

4. Process defined by claim 1 carried out with from 0.1 to 6 gram atoms oxygen per gram mole of said compound in the feed gas mixture.

5. Process defined by claim 1 carried out with the defined compound to be dehydrogenated constituting not more than 20 mole percent of the total feed gas mixture.

6. Process defined by claim 1 carried out with from 0.5 to 20 moles $H_2O$ per mole of said compound in the feed gas mixture.

7. Process defined by claim 1 wherein the compound subject to the defined dehydrogenation process comprises isobutyric acid and the product is methacrylic acid.

8. Process defined by claim 1 wherein the compound subject to the defined dehydrogenation process comprises methyl isobutyrate and the product is methyl methacrylate.

References Cited

UNITED STATES PATENTS 3,207,805  9/1965  Gay _____ 260—486 X

LORRAINE A. WEINBERGER, Primary Examiner

P. J. KILLOS, Assistant Examiner

U.S. Cl. X.R.

252—437; 260—526 N